United States Patent [19]
DeBusk et al.

[11] Patent Number: 5,682,728
[45] Date of Patent: Nov. 4, 1997

[54] METHOD FOR THE SUPPLY OF MEDICAL SUPPLIES TO A HEALTH-CARE INSTITUTION BASED ON A NESTED BILL OF MATERIALS ON A PROCEDURE LEVEL

[75] Inventors: Autry O. V. DeBusk, Knoxville; Brian C. DeBusk, Clinton; James M. Mabry; Steven J. Polte, both of Knoxville, all of Tenn.

[73] Assignee: DeRoyal Industries, Inc., Powell, Tenn.

[21] Appl. No.: 489,496

[22] Filed: Jun. 12, 1995

[51] Int. Cl.$^6$ .............................. B65B 5/00; B65B 11/58; B65B 61/20
[52] U.S. Cl. .............................. 53/445; 53/467; 53/468; 53/449; 53/474
[58] Field of Search .............................. 53/443, 445, 467, 53/468, 474, 492, 449, 475, 155, 238, 240

[56] References Cited

U.S. PATENT DOCUMENTS 4,174,598  11/1979  Shepherd et al. ..................... 53/468
5,235,795   8/1993  DeBusk .................................. 53/467

FOREIGN PATENT DOCUMENTS 556093  8/1993  European Pat. Off. ............... 53/468

*Primary Examiner*—Linda Johnson
*Attorney, Agent, or Firm*—Paul E. Hodges, P.C.

[57] ABSTRACT

A method for integration of the institutional supply chain for medical products utilizing a nested bill of materials on a care event level of a clinical pathway for one or more medical procedures. The medical supplies appropriate for use in a care event are expressed as a bill of materials. Each item of medical supply is assigned a unique identifier which includes at least identification of the item itself, identification of the supplier of the item, and identification of the care event with which the item is to be used. At a first location a portion of the supplies are unitized and containerized. This subassembly is transported to a second and remote location where further of the supplies are unitized and containerized, using the same container. Thereafter the unitized and containerized supplies are transported to the end user thereof.

6 Claims, 3 Drawing Sheets

METHOD FOR THE SUPPLY OF MEDICAL SUPPLIES TO A HEALTH-CARE INSTITUTION BASED ON A NESTED BILL OF MATERIALS ON A PROCEDURE LEVEL

FIELD OF INVENTION

This invention relates to the supply of medical supplies to patient care institutions, and particularly to methods for the assembly, transport and storage of disposable medical supplies.

BACKGROUND OF INVENTION

In the medical care industry, constant vigilance is maintained over the cost of the care provided to patients, with particular attention being given simultaneously to assuring the well-being of the patient. One method currently being practiced by some health care institutions, particularly hospitals, is centered around the concept of clinical pathways. As used in this environment, the concept attempts to bring to bear upon the care afforded a patient all those resources of the institution which are dictated by the nature of the patient's illness and which will provide the dictated care, and result in the patient being restored to that state of health that permits proper release from the institution after a minimum length of stay. The use of the clinical pathway concept has been demonstrated to reduce the length of stay in an institution of a patient. It has further been demonstrated to reduce the overall cost of the treatment of the patient while in the institution by ensuring that no ill effect associated with the patient's stay in the institution caused the patient to require more that a standard regimen of treatment for a specific illness. For example, through proper care, the patient is prevented from developing decubitus ulcers which could require that the patient remain in the institution for an extended period of time, just for treatment of the ulcers.

In health-care institutions employing the clinical pathway concept, there is developed within the institution a protocol for the treatment of a given illness, surgical procedure, or other regimen of medical care to be provided to a patient (termed a "procedure"). This protocol lists the contribution of each institutional unit (e.g. department) toward the treatment of the patient (termed a "care event"), and the sequence in which each care event is to occur. This protocol then becomes the "standard" for the care to be provided for any patient entering the institution and suffering from the particular illness (medical diagnosis) which is addressed by the protocol.

Prior to the present invention, the clinical pathway concept has been applied internally of health care institutions, affecting only those services which originate within the institution and which are provided by the internal resources of the institution. No correlation of the protocol to the cost of supplies is known to have been made prior to the present invention. Yet, one of the major sources of costs associated with the treatment of a patient in an institution is the cost of the supplies which are consumed by the institution. Because of this shortcoming of the clinical pathway concept, health care institutions have failed to achieve significant cost savings as respects the supplies used in the course of any given protocol. This is especially true with regard to disposable medical supplies which typically are supplied to the institution from outside sources.

U.S. Pat. No. 5,235,795 discloses a method for the delivery, storage, transport and disposal of medical supplies to a health care institution in which the ultimate cost to the institution of the medical supplies is reduced by supplying disposable medical supplies direct from a supplier in receptacles which may thereafter be used by the institution in safely disposing of waste medical supplies. This method is dependent upon the institution identifying the supplies needed and placing an order for the same from a supplier. The usefulness of the method therefore is limited by the institution's accuracy of ordering. If the institution has inadequate facilities to determine its supply needs, and as a consequence orders too little or too much of a given supply item, this prior art system has no means for detecting this shortcoming.

It is therefore an object of the present invention to provide a method for the selection and delivery of medical supplies to a health-care institution.

Other objects and advantages of the invention will be recognized from the description provided herein, including the claims and drawings in which:

SUMMARY OF INVENTION

Figure 1:
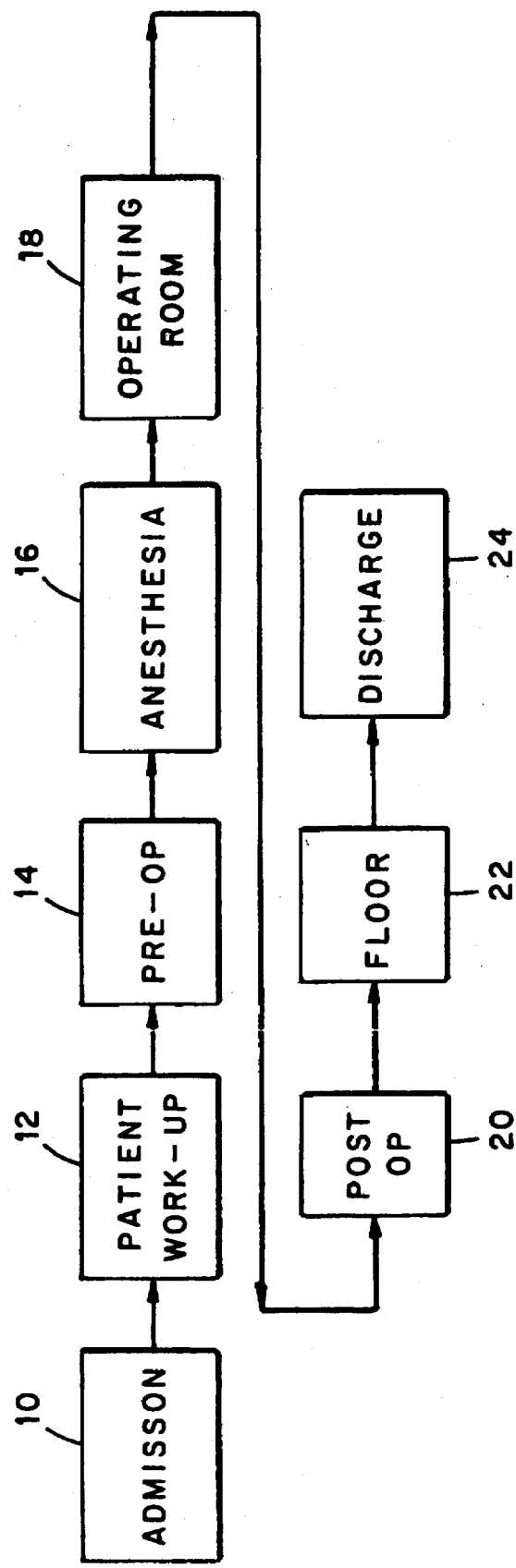
FIG. 1 is a diagrammatic representation of a generic clinical pathway as applied to a health-care institution.

In accordance with the method of the present invention, the supply needs of a health-care institution are integrated into a system for the delivery of these supplies to the institution. The method comprises a nested multi-level system in which the smallest element of unitization in the system is termed a "unit". Units are combined into supply bundles which are subassemblies to consumption levels (i.e. care events) within a clinical pathway, and consumption levels are subassemblies to a particular clinical pathway. In this manner, the institution may follow an object-oriented, unitized approach to supply consumption along with the clinical pathway.

The method of the present invention includes the steps of expressing those items of medical supplies which a health care institution requires for a given care event (consumption level) in a clinical pathway for a given medical procedure, as a bill of materials, employing identification codes (identifiers) which include at least an identification of the care event with which the supply is to be used, an identification of the supplier of the item of supply, and an identification of the item itself. Employing the identification codes, a bill of materials which is representative of those medical supplies identified for a given care event within a clinical pathway, is prepared preferably at a first location of medical supplies. At the first location, at least a first portion of the medical supplies on the bill of materials is unitized into a unit. One or more units may be prepared. The unit or units are deposited in a container having a void volume which is greater that the volume occupied by the unit. The container with the unitized medical supplies therein is releasably closed and thereafter transported to a remotely located second supplier of at least a portion of the supplies listed on the bill of materials. At the location of the second supplier which is remote from the location of the first supplier, at least a second portion of the medical supplies on the bill of materials is unitized. At the location of the second supplier, the container is opened and the unit or units of medical supplies provided by the second supplier are deposited inside the container, the container is re-closed and transported with the medical supplies contained therein to the location of an end-user of the medical supplies. The end user of the containerized medical supplies, commonly is a department in a care provider (e.g. operating room of a hospital). In certain instances it may be desired that the care provider also add medical supplies to the container. In this case, the container with the unitized medical supplies from the first and second supplier is releasably closed and shipped from the second supplier to the care provider. This care provider thereupon opens the container and adds to the container those medical supplies which it can most advantageously supply. The container may then be closed and either placed in inventory or transported to the end user. The present method accommodates these steps of the procedure in that the initial bill of materials lists thereon those medical supplies which are to be added to the container by the care provider prior to the container being forwarded to the end user. This method provides advance notice to each tier of suppliers as to precisely where and what products are to be required and it provides the means by which each supplier can ensure the availability of its designated medical supplies well in advance of the need therefor. Ordering of medical supplies from a manufacturer and inventorying of the supplies are both enhanced by the present method.

The unique identifiers employed in the present method serve multiple purposes. These codes include identification of the supplier of each item of medical supply, through multiple levels of supply within the supply chain as necessary, thereby providing traceability of the item to its source as is required by federal and other regulations for the handling of medical supplies, particularly sterile medical supplies. Further, each code includes identification of that care event within the clinical pathway of the institution where the supply item is to be used, thereby assuring that the particular supply item is delivered to its intended point of use, so that the institution's clinical pathway is not disrupted by reason of the item of supply not being available at the time and place with the institution when needed. First, This aspect of the method permits the institution to order disposable medical supplies by procedure, as opposed to the traditional ordering of individual items of medical supplies for warehousing at the institution and withdrawing from the stock of these supplies as needed. Second, this aspect of the method further permits the institution to stock medical supplies on the basis of historical information as to the number of given medical procedures (care events) that are to be expected within a given time frame. This capability permits the institution to stock standardized units of supplies for statistically calculable demands for the supplies and thereby reduce supply inventories.

DETAILED DESCRIPTION OF INVENTION

Referring to FIG. 1, a generic clinical pathway for a given medical procedure within a health-care institution may include a series of care events such as admission 10, patient work-up 12, pre-op 14, anesthesia 16, operating room 18, post-op 20, floor 22 and discharge 24. In accordance with the present invention, the disposable medical supplies which the institution must obtain from a source outside the institution, as well as any medical supplies that are to be provided by the institution itself, and which are associated with a given care event, are identified. Each identified item of supply is assigned a unique code which identifies at least the item itself, the source for the item and the care event with which the item is to be used within the institution. Each code also may include identifiers of the anticipated user of the supply, such as a surgeon's initials, and other identifier information.

Preferably, the federally promulgated ICD-9 code (International Classification of Disease—9th Revision) for a given medical procedure is used to identify the clinical pathway with which the supply item is to be used.

The preferred code further includes an identifier for the location within the clinical pathway, i.e. care event at which the bundle of supplies is to be consumed, e.g. in the operating room. Accordingly, the code comprises a nested multi-level system—the supply item identification, bundle identification, supplier identification, and care event identification.

A typical code, listing the levels of the code, for a supply item is given below:

| | |
|---|---|
| 90-aaaabbbcxxxxx | Clinical Pathway Level |
| aaaa | ICD-9 code (without decimal point) |
| bbb | Surgeon's initials |
| c | product configuration code (guarantees unique number) |
| xxxxx | not used (blank) |
| 91-3333ffffggggg | Consumption Point Level |
| eeee | consumption point identifier code |
| ffff | protocol identification code |
| ggggg | code used to guarantee a unique number |
| 92-hhhiiiiiiixxx | Supply Bundle Level |
| hhh | supplier identifier code |
| iiiiiii | unique serialized identifier code |
| xxx | code used to guarantee a unique number |

A typical bill of materials developed from the unique number and coded supply items associated with the operating room level of the clinical pathway for a laparoscopy cholestomectomy protocol (performed by Dr. Jones) is given below:

| PART | DESCRIPTION | QTY |
|---|---|---|
| 90-0926JAJSO768 | Dr. Jones Lap Choy Procedure | 1 |
| 56-11208 | TraceCart Lid | 1 |
| 56-11360 | TraceCart Base, 30 Gallon | 1 |
| 91-OPRRM4620768 | Operating Room Supply Bundle | 1 |
| 92-DER3345380768 | DeRoyal Supply Bundle for OR | 1 |
| 50-9783P | Basic Endo Pack | 1 |
| 28-0500 | Probe, Irrig/Aspir w/Tubing | |
| 56-50315 | Tape, Video VHS 120 | |
| 71-1101 | Suction Canister, 1500cc | 1 |
| 92-OMI334580768 | O & M Supply Bundle for OR | 1 |
| OMI1553522 | Grounding Pad, Hydrogel, REM | I |
| OMI1832354 | Tray, Skin Prep | 1 |
| OMI1443872 | Tray, Foley 16Fr 5CC | 1 |
| OMI1883624 | Cath, IV PL Unit | 1 |

Each identifier (identification code) may include alpha, numeric or a combination of alpha and numeric characters. The maximum number of characters in any given identifier is limited only by the data handling system(s) available to the manufacturer, the distributor, the institution, and the end-user. It will be recognized that the entity which initiates a bill of materials must have access to full information for each care event as will enable the entity to generate the bill of materials. This includes information as to which medical supplies and how many of each, are required by a given health care provider for a given care event. It also requires that the initiator of the bill of materials have in its database full information as to the source and identification of each item of medical supplies which is to be provided for a given care event.

In the present method, the identifiers associated with the medical supplies intended for a given care event, within a clinical pathway, are initially expressed as a bill of materials which is thereafter used as the basis for collecting and unitizing the medical supplies. A single bill of materials for a given supply bundle is used by all providers of medical supplies that go to make up the supply bundle.

Figure 2:
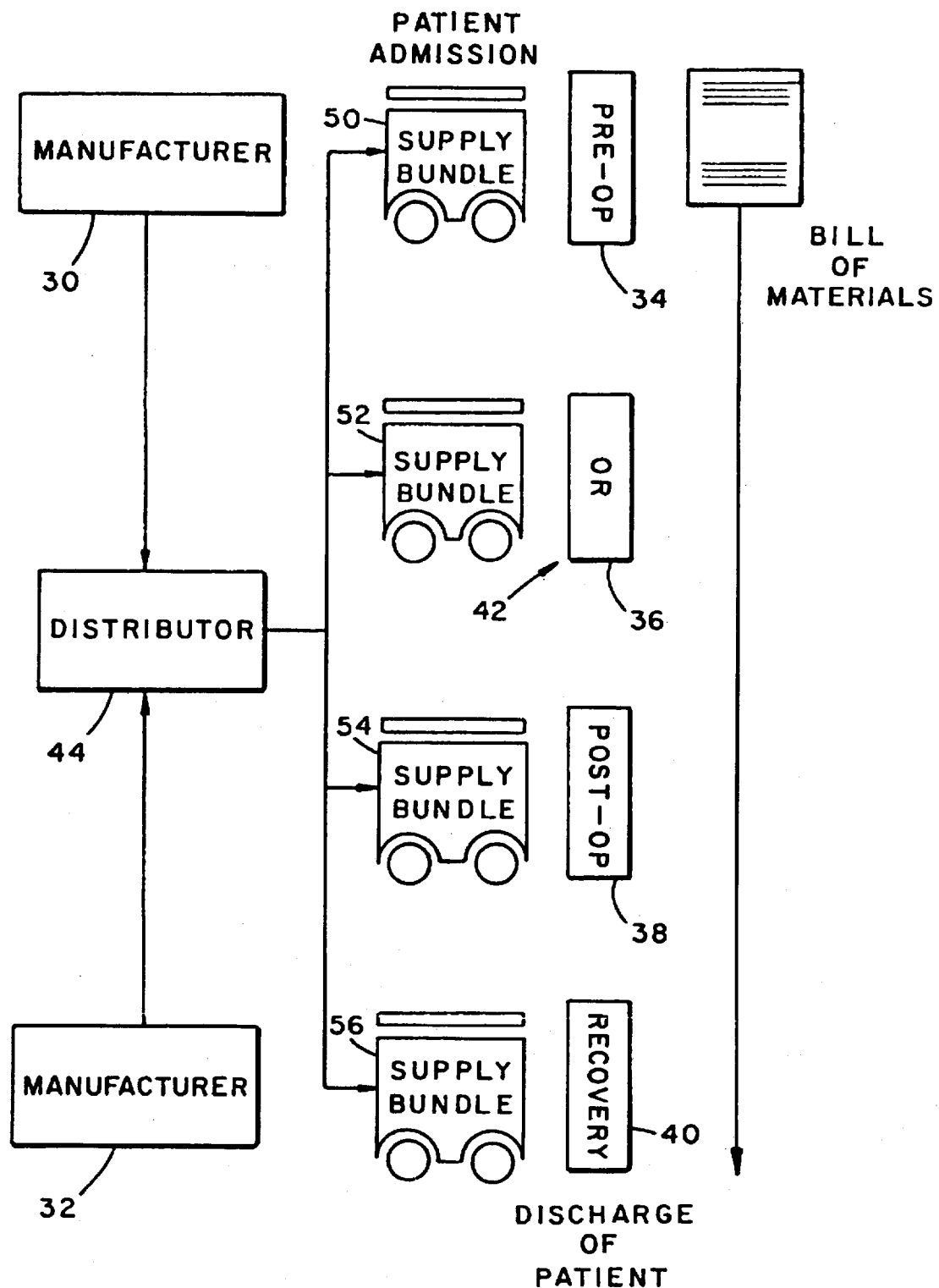
FIG. 2 is a diagrammatic representation depicting various aspects of one embodiment of the method of the present invention.
Figure 3:
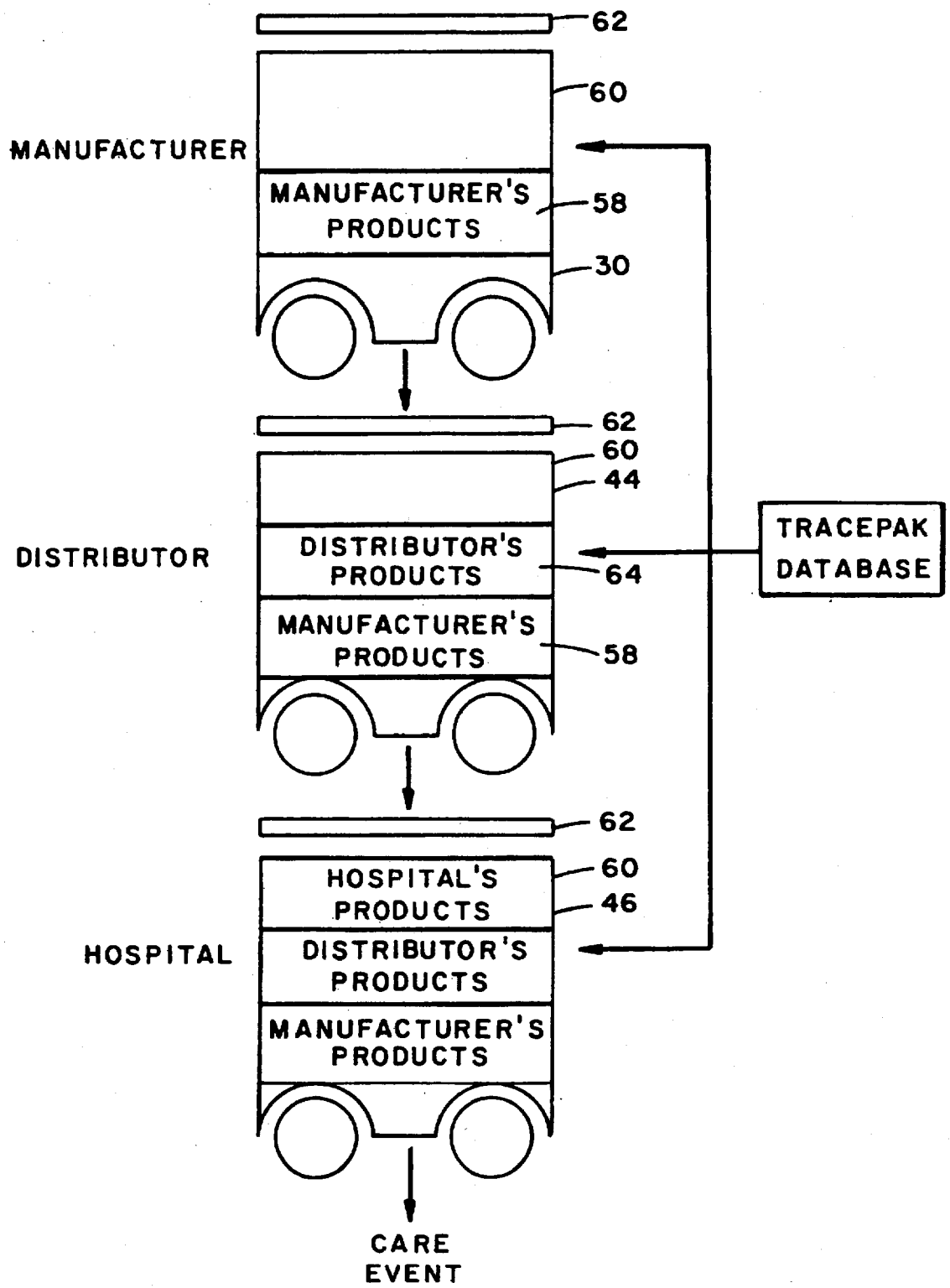
FIG. 3 is a diagrammatic representation depicting other aspects of one embodiment of the method of the present invention.

With reference to FIGS. 2 and 3, in accordance with one embodiment of the present method, a typical supply chain for products made, delivered and eventually used in a medical care facility, such as a hospital, which employs the clinical path concept in its patient care functions, includes one or more manufacturers 30 and 32 of one or more of the supply items used in one or more of the care events 34, 36, 38 and 40 of a clinical path, indicated generally by the numeral 42, and, optionally, is a distributor 44 of one or more of the supply items used in one or more of the care events of the clinical pathway. The supply chain is completed by the inclusion of the medical care facility 46 itself. In certain instances, medical supplies for a given care event may be supplied by the manufacturer and by the hospital, or by the distributor and the hospital or by all three, or even including multiple distributors or multiple manufacturers.

With further reference to FIGS. 2 and 3, in one embodiment of the present method, supply bundles 50, 52, 54 and 56 which are intended for use within respective care events 34, 36, 38 and 40, originate with one or more manufacturers 30 and 32. At a first manufacturer's 30 location, one or more supply items, manufactured, assembled or otherwise provided by the manufacturer, are unitized into a unit 58. This unit of medical supply items is placed in a container 60 which is releasably closed, as by a removable lid 62. Optionally, and most commonly, this container and its contents are thereafter transferred to the location of a distributor 44 where one or more additional supply items are unitized into a further unit 64 and placed in the container 60. The container with its contents of medical supplies is referred to as a "supply bundle". The supply items provided by the distributor commonly are products provided by a second manufacturer 32 other than the first manufacturer, thereby, requiring that either the distributor or the second manufacturer cooperate in assigning to the supply items provided to a supply bundle appropriate identifiers that are consistent with the identifier protocol established between the medical care provider and the first manufacturer, for example. This most commonly is accomplished by the first manufacturer initially establishing an identifier for each medical supply item to be included in a given bundle, plus other appropriate identification elements, which the distributor also uses. For example, the distributor may affix the appropriate identifier which is provided by the manufacturer, to each supply item which the distributor adds to the bundle.

The container with the two or more units of medical supplies contained therein is releasably resealed by the distributor and transported to the medical care facility, e.g. a hospital. As depicted in FIGS. 2 and 3, at the hospital, each supply bundle, comprising the container, its lid, and one or more units of medical supply items, is delivered to the location of that care event for which the supply bundle was designed, for example, to the OR (operating room) when needed. As noted above, the hospital, through its historical usage records for its medical supplies for a given care event, can readily order from a manufacturer, and the manufacturer (and distributor) can readily deliver, in a timely fashion, those medical supplies which are required for the given care event. Timing of the ordering and delivery of a given supply bundle is further enhanced through the use of the hospital's historical records relating to the frequency of occurrence of a given care event within the hospital.

In accordance with another aspect of the present method, the inventors have found that many care events, as defined in the clinical pathway concept of providing patient care, even though taking place at different levels of a given clinical pathway and/or even in the clinical pathway for disparate illnesses (i.e. for different ICD-9 codes) call for the use of common items of medical supplies. Therefore, based upon a given hospital's historical occurrence rate of all (or many) of its ICD-9s in combination with the hospital's usage rate for each of its care events, irrespective of the ICD-9 with which the care event may be associated, the inventors can project the total usage by the hospital over time of each item of its medical supplies. With this information in hand, a manufacturer of a variety of medical supplies can anticipate the usage of those medical supplies which it contemplates that it will provide to the supply bundle. The manufacturer, therefore, can more efficiently control its ordering and inventorying of raw materials, can better schedule its manufacturing operations, and can reduce its inventories of finished goods. Because of this capability, the medical supplies can be provided to the hospital at a cost that permits the hospital to minimize its cost of providing health care to its patients. These same benefits are available to the distributor, the hospital, or any other entity in the supply chain.

One feature of the present method provides for the generation of the bill of materials at the outset, i.e. upon receipt by the manufacturer of an order for a particular bundle. Since the bill of materials as initially generated includes identification of the supply items which are to be provided by each of the manufacturer, the distributor and/or the hospital, a copy of the bill of materials provided to each entity substantially immediately upon its completion provides useful advance notice to the entities so notified that the order has been received and is being processed. Importantly, this advance notice also identifies to each entity the products which they are expected to provide so that they can "preprocess" the order by collecting and unitizing the supply items in anticipation of receipt of a container from the entity ahead of them in the supply chain. This feature shortens the time between placement of an order and delivery of the product to the extent that the hospital can rely on "just-in-time" type delivery of the needed supplies. This results in less inventory of supplies at the hospital and reduced costs. Like inventory cost savings are experienced by the distributor.

Still further, the present method, and its shortened delivery time for specific medical supplies, permits the hospital to include patient-specific items in a given bundle. For example, patient-sized items such as endotracheal tubes and foley catheters commonly can not be specified until the patient surgery (or other specific treatment) is scheduled. Heretofore, the hospital and/or distributor had to keep on hand inventories of such patient specific supplies. Because of the control over inventory and short lead time afforded by the present method, these items can be included in a specific bundle which is labeled for a specific patient. Again, this permits the hospital to reduce its level of inventory of the medical supplies and realize monetary savings.

The unitizing of the medical supplies by a manufacturer may take any appropriate form, but preferably includes collecting the medical supply items and enclosing them in a protective cover, such as a bag (which may be sealed) or a wrap of the type known in the art as a sterile wrap. The function of the protective cover is two-fold primarily. First, the cover protects the products from possible contamination and from possible damage due to shifting or movement during transit or handling. Second, the cover unitizes, that is segregates, the collection of medical supplies so that the unit can be readily identified. This identification includes identification of the unit as a billable item for purposes of reimbursement accounting. That is, the unit, through its unique identifier, provides both the hospital and a third party payment provider, such as Medicare, Medicaid or insurance company, with sufficient information to qualify the unit of medical supplies as a valid reimbursable entity.

The container employed in the present method can be one of the type which is disclosed in U.S. Pat. No. 5,235,795, for example, which patent is incorporated herein in its entirety, by reference thereto. This patent further describes a type of packaging of medical supplies which is acceptable for use in the present method. Other containers, including bags or conventional boxes may be employed.

Whereas specific description of various aspects of the present invention have been described herein, it is intended that the invention be limited only by the claims appended hereto. For example, the specific composition of the identifier to be used need not be precisely like that which is disclosed, but may include more, or in some instances, less identifying indicia without departing from the essence of the invention. Further, in certain instances, the supply chain may not include a distributor, but rather the first provider may be the manufacturer and the second provider to add supply items to the bundle may be the hospital, itself.

Whereon specific description of various features of the invention be limited only by the claims appended hereto.

What is claimed:

1. A method for integration of the institutional supply chain for medical products utilizing a nested bill of materials on a care event level of a clinical pathway for one or more medical procedures comprising the steps of expressing a list of medical supply items appropriate for use in a care event as a bill of materials which is representative of at least one care event along a clinical pathway for a medical procedure, providing the information on said bill of materials to at least a first and second supplier of the medical supply items listed on said bill of materials, at the location of a first supplier of at least a portion of the medical supply items on said bill of materials, segregating from an inventory of medical supply items one or more distinct medical supply items as a first unit, each of said items being included on said bill of materials, but the total number of the items withdrawn being less than the total number of items on said bill of materials, selecting a container having a void volume which is greater than the volume required to contain said first unit of medical supply items, depositing said first unit of medical supply items in said container, and releasably closing said container, transporting said container to a second supplier of at least a portion of the medical supplies of the kind identified on said bill of materials, said second supplier being located remotely of said first supplier, at the location of said remotely located second supplier, opening said container, segregating from an inventory of medical supply items one or more distinct medical supply items as a second unit, each of said items being included on said bill of materials, but the total number of the items withdrawn being less than the total number of items on said bill of materials, opening said container, depositing said second unit in said container, and releasably closing said container, transporting said container with said first and second units of medical supplies contained therein to the site of said care event.

2. The method of claim 1 and including the step of including a copy of said bill of materials in said container at the location of said first supplier, which bill of materials continues with said container to the site of said care event.

3. The method of claim 1 wherein said step of expressing the list of medical supplies for a given care event as a bill of materials includes associating with each item of medical supplies on the list a unique identifier.

4. The method of claim 3 wherein said identifier further includes a coded identification of the care event for which the medical supplies are intended, and the supplier of each item of medical supply on the list, thereby providing traceability of each of the items of medical supplies.

5. The method of claim 3 wherein said identifier comprises alpha, numeric or a combination of alpha and numeric characters.

6. The method of claim 1 and including the steps of transporting said container with said first and second units of medical supplies contained therein to a health care institution where that medical procedure is intended to occur, prior to delivery of the container to the site of said care event, opening said container at the health care institution, adding additional medical supplies to said container, releasably closing said container and thereafter delivering said container with said medical supplies to an end-user of said medical supplies.

* * * * *